United States Patent [19]

Kato et al.

[11] Patent Number: 5,151,256

[45] Date of Patent: Sep. 29, 1992

[54] COAL COMBUSTION APPARATUS PROVIDED WITH A DENITRATION

[75] Inventors: Yasuyoshi Kato; Kunihiko Konishi; Nobue Teshima; Toshiaki Matsuda; Hiroshi Akama, all of Kure, Japan

[73] Assignee: Babcock-Hitachi Kabushiki Kaisha, Tokyo, Japan

[21] Appl. No.: 673,256

[22] Filed: May 2, 1991

Related U.S. Application Data

[62] Division of Ser. No. 296,209, Jan. 12, 1989, abandoned.

[30] Foreign Application Priority Data

Jan. 19, 1988 [JP] Japan .................. 63-9169

[51] Int. Cl.$^5$ .......................... B01D 47/00; B01J 8/00; C01B 21/00
[52] U.S. Cl. ........................ 423/210; 423/239
[58] Field of Search ............. 423/235, 244 A, 239, 423/239 A, 210

[56] References Cited

U.S. PATENT DOCUMENTS

| | | | |
|---|---|---|---|
| 3,913,323 | 10/1975 | August | 200/288 |
| 4,455,281 | 6/1984 | Ishida et al. | 422/171 |
| 4,571,329 | 2/1986 | Kato et al. | 423/239 |
| 4,844,875 | 7/1989 | Eltehadieh | 423/210 |

FOREIGN PATENT DOCUMENTS

| | | | |
|---|---|---|---|
| 58-124525 | 7/1983 | Japan | 423/239 |
| 1-94925 | 4/1989 | Japan | 423/239 |

Primary Examiner—Gregory A. Heller
Attorney, Agent, or Firm—Fay, Sharpe, Beall, Fagan, Minnich & McKee

[57] ABSTRACT

A coal combustion apparatus having prevented deterioration of a denitration catalyst due to volatile metal compounds contained in exhaust gases is provided, which apparatus comprises a combustion furnace, a denitration means for removing nitrogen oxides in an exhaust gas from the furnace by reducing nitrogen oxide with ammonia, a means for collecting ashes in the gas having left the denitration means and a means for recycling the collected ashes into the furnace, and is characterized in providing an oxygen concentration meter in the flow path of the gas between the furnace and the denitration means and also providing an oxygen concentration-controlling means relative to air fed inside the flow path of the gas from the furnace to the denitration means so as to control the oxygen concentration detected by the oxygen concentration meter to a definite value or higher.

6 Claims, 2 Drawing Sheets

COAL COMBUSTION APPARATUS PROVIDED WITH A DENITRATION

This is a divisional of application Ser. No. 296,209, filed Jan. 12, 1989, now abandoned.

BACKGROUND OF THE INVENTION

1. Field of the Invention

This invention relates to a coal combustion apparatus provided with a denitration means. More particularly it relates to a coal combustion apparatus devised so that a denitration catalyst can be hardly poisoned by volatile metal compounds contained in exhaust gases in a denitration means for catalytic reduction with ammonia, and a method for eliminating said volatile metal compounds from said exhaust gases.

2. Description of the Related Art

Heretofore, for removing nitrogen oxides contained in exhaust gases from a coal combustion apparatus such as boiler facilities, etc., a catalytic reduction process using ammonia as a reducing agent has been mainly employed. A model of boiler facilities provided with a denitration apparatus is shown in FIG. 2 of the accompanying drawings. The boiler facilities comprise a boiler furnace 2 provided with a coal-feeding flow path 1 and a slag-discharging flow path 9, and a denitration apparatus 3, an air preheater 5, an electrostatic precipitator 6 and a chimney 7, each successively provided in the exhaust gas flow path of the boiler furnace 2 and further a line 8 for recycling ashes collected in the electrostatic precipitator.

In the boiler facilities shown in FIG. 2, simple substances or oxides of highly volatile elements such as arsenic, selenium, lead, zinc, etc. volatize inside the boiler furnace 2, and are mostly adsorbed to fly ashes (powder of coal combustion ashes), before they are collected by the electrostatic precipitator 6.

The fly ashes having adsorbed the compounds of the volatile elements are blown into the boiler furnace via a fly ash-recycling path 8 and recovered through a slag-discharging path 9 to the outside, but the compounds of the volatile elements are left behind inside the boiler system in the form of vapor and present in the form of a highly concentrated vapor in the exhaust gas. When the denitration apparatus 3 is provided inside the flow path of the exhaust gas containing such a vapor of the volatile metal compounds, a denitration catalyst 4 in the denitration apparatus 3 adsorbs the highly concentrated volatile metal compounds to notably reduce its activity.

The present inventors have previously invented a denitration catalyst having small deterioration enough to be usable even in such boiler facilities and have applied for patent (Japanese patent application No. Sho 62-141176/1988), but nevertheless it is necessary to take some countermeasure for preventing the deterioration, in addition to the catalyst improvement.

SUMMARY OF THE INVENTION

The object of the present invention is to provided a coal combustion apparatus having prevented deterioration of the denitration catalyst due to volatile metal compounds contained in exhaust gases, and a method for eliminating said volatile metal compounds from the exhaust gas.

The present invention resides in;

a coal combustion apparatus comprising a combustion furnace, a denitration means for removing nitrogen oxides contained in an exhaust gas from the combustion furnace by reducing the oxides with ammonia as a reducing agent, a means for collecting ashes contained in the exhaust gas having left the denitration means and a means for recycling the collected ashes into the combustion furnace, which apparatus is provided with an oxygen concentration meter in the flow path of the exhaust gas between the combustion furnace and the denitration means and also provided with an oxygen concentration-controlling means relative to air fed inside the flow path of the exhaust gas from the combustion furnace to the denitration means so as to control the oxygen concentration detected by the oxygen concentration meter to a definite value or higher.

The present invention also resides in;

a method for eliminating volatile metal compounds in an exhaust gas from a coal combustion apparatus provided with a denitration means for catalytic reduction with ammonia, which comprises blowing an air into the exhaust gas at a temperature of 500° C. or heigher until said exhaust gas contains 2% by volume or more of oxygen to oxidize said volatile metal compounds and making said oxidized metal compounds adsorb to fly ashes in the exhaust gas during the process of its moving downstream to the denitration means.

DETAILED DESCRIPTION OF PREFERRED EMBODIMENTS

The embodiment of the present invention will be described in more detail referring to the accompanying drawings.

Figure 1:
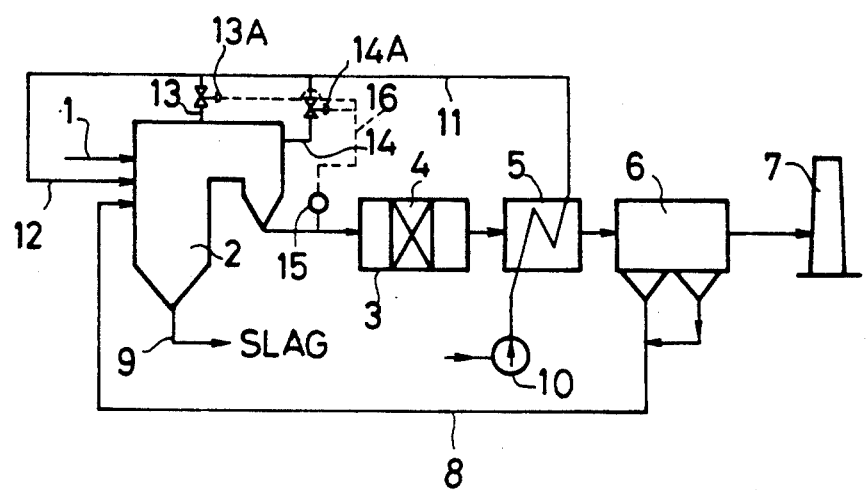
FIG. 1 shows a view illustrating an embodiment of the present invention.
Figure 2:
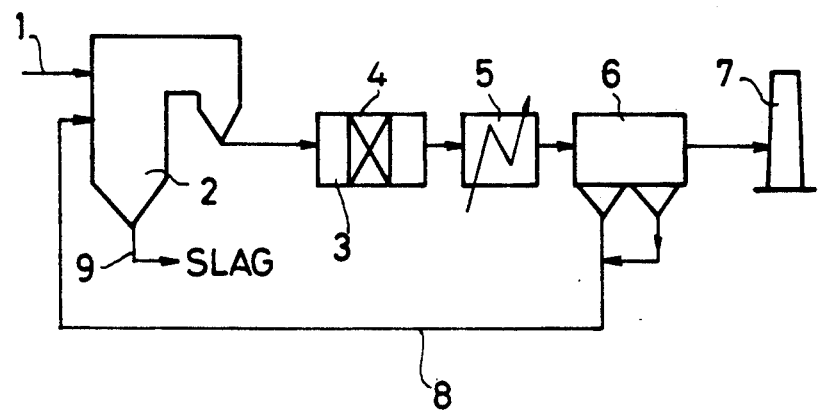
FIG. 2 shows a view illustrating the prior art.

FIG. 1 shows a flowsheet illustrating a coal combustion boiler furnace provided with a denitration means according to the present invention. The furnace is composed of a furnace 2, a denitration apparatus 3; an air preheater 5; an electrostatic precipitator 6; a chimney 7; a line 8 for recycling ashes collected in the electrostatic precipitator 6 to the furnace 6; a hot-air duct 11 for feeding air heated in the air preheater 5 to the furnace 2; adding air-feeding pipes 13 and 14 successively provided in the flow path of combustion gas of the furnace 2; an oxygen concentration meter 15 provided on an exhaust gas inlet line to the denitration means; valves 13A and 13B for controlling the amount of air added, by receiving a signal from the oxygen concentration meter 15 and controlling the opening degree of the valves so that the oxygen concentration can reach a preset concentration (2% by volume or more); and a line 16 for transmitting the oxygen concentration signal at the oxygen concentration meter 15 to the controlling valves 13A and 14A.

In the above-mentioned system, air sent from a blower 10 to the air preheater 5 is heated up to a definite temperature, followed by passing through a hot-air duct 11 and being fed through a pipe for feeding air for combustion 12 into the boiler furnace 2. The oxygen concentration in the combustion exhaust gas at the exit of the boiler is measured by the oxygen concentration meter 15, and when the measured value is reduced down to a value lower than 2% by volume, air is fed through the added air-feeding pipes 13 or 14 so that the concentration can reach 2% by volume or higher. The oxygen concentration in the exhaust gas, measured by the oxygen concentration meter 15 is proper to be 2% by volume or higher, and there is a tendency that the higher the concentration, the greater the effectiveness. However, since increase in the oxygen concentration is disadvantageous in the aspect of heat loss, the concentration is preferably about 3 to 4% by volume.

The reason that in the present invention, operation is carried out raising the oxygen concentration in the exhaust gas entering the denitration means up to a definite value (2% by volume) or higher is as follows:

Volatile metal compounds contained in coal, for example, arsenic compounds are oxidized in the boiler furnace 2 to form arsenous anhydride ($As_2O_3$) vapor having a high vapor pressure, which is then adsorbed to fly ashes during the course where it is moved toward the subsequent step, and the resulting fly ashes are collected by the electrostatic precipitator 6, then recycled to the furnace 9 and come to be present in the exhaust gas in the form of vapor having a gradually raised concentration. When the exhaust gas reaches the denitration apparatus 3 in such a manner, if $As_2O_3$ vapor is remaining without being adsorbed to fly ashes, then the $As_2O_3$ vapor is adsorbed to the denitration catalyst 4 in the denitration apparatus 3 to cause catalyst deterioration. Whereas, when operation is carried out raising the oxygen concentration in the exhaust gas up to a definite value or higher, as in the present invention, then the $As_2O_3$ is oxidized into arsenic pentoxide having a lower oxygen pressure during the course before the boiler furnace 2 and the denitration means 3, as shown by the following equation:

$$As_2O_3 + O_2 \rightarrow As_2O_5.$$

As the proportion of this $As_2O_5$ having a higher vapor pressure increases, the proportion of arsenic compounds adsorbed to fly ashes before they reach the denitration apparatus 3 increases, and it has been observed that $As_2O_3$ in the form of vapor is nearly absent. Thus it has been found that adsorption of arsenic compounds to the denitration catalyst 4 is reduced to make it possible to notably reduce its deterioration.

In order to oxidize $As_2O_3$ in the exhaust gas into $As_2O_5$, it is preferred that the temperature of the exhaust gas be 500° C. or higher. Thus the site where the added air is fed is preferred to be a site where the combustion exhaust gas temperature is 500° C. or higher. As to the added air, it may be cold air, but it is preferred to be air heated by air preheater, etc. As described above, if combustion inside the furnace is carried out in a high oxygen concentration (oxygen concentration in the exhaust gas: 2% by volume or higher), then coal combustion is completed in a short time and the vapor of volatile metal oxides such as $As_2O_3$, etc. is retained in the oxidation atmosphere for a long time to thereby increase the proportion of $As_2O_3$ oxidized into $As_2O_5$.

As described above, when $As_2O_3$ in exhaust gas is oxidized into $As_2O_5$ before the $As_2O_3$ enters the denitration means, adsorption of catalyst poisons such as arsenic compounds to the fly ashes in the exhaust gas advances to thereby reduce the concentration of catalyst poisons in the form of vapor in the exhaust gas, whereby the amount of catalyst poisons adsorbed to the catalyst 4 in the denitration apparatus 3 is reduced to make it possible to retain the catalyst at a high activity for a long time.

The boiler furnace 2 in FIG. 1 is the so-called melting combustion furnace (which is of a type of melting ashes and withdrawing them from the furnace bottom) provided with a combustion furnace of cyclone type or slag-tapping type. In the case of the slag-tapping type combustion furnace, since lower oxygen combustion is carried out as compared with conventional combustion, the oxygen concentration in the combustion exhaust gas is insufficient so that the denitration catalyst is liable to deteriorate; hence the present invention is particularly suitable in such a case.

The denitration apparatus 3 contains a denitration catalyst such as titanium oxide, vanadium oxide, molybdenum oxide, etc. filled in the body of the means. The denitration apparatus is provided usually on the exit side of the boiler furnace, particularly in the flow path at the exit of the economizer, but the combustion gas may be by-passed from the inlet part of the economizer where the denitration apparatus is provided.

The present invention will be described in more detail by way of Examples.

EXAMPLES 1-3

To a metatitanic acid slurry ($TiO_2$ content: 30% by weight) were added ammonium metavanadate ($NH_4VO_3$) and ammonium molybdate ($3(NH_4)_2O.7MoO_3.4H_2O$) so as to give an atomic ratio of Ti/V/Mo of 86/4/10, followed by kneading these on heating by means of a kneader to obtain a paste having a water content of 34%. This paste was extruded into the form of a rod of 3 mm $\phi$, followed by cutting it into granules, drying at 150° C., calcining for 2 hours at 350° C., grinding the resulting granules by means of a hammer mill to obtain powder (the proportion of powder of 100 meshes or smaller: 97%), adding water to the powder to obtain a paste, adding alumina-silica fibers in 15% by weight based on the weight of the catalyst powder, kneading the mixture, applying the resulting paste onto both the surfaces of a lath substrate of SUS 304 of 0.2 mm thick having metal aluminum flame-sprayed thereon so as to embed the meshes thereof, drying the resulting material, calcining at 55° C. for 2 hours, impregnating the resulting plate-form catalyst with an aqueous solution of aluminum sulfate ($Al_2(SO_4)_3$) (concentration: 200 g/l), further calcining the resulting material at 470° C. for 2 hours to obtain a catalyst, cutting the catalyst into test pieces of 100 mm × 100 mm and placing the pieces at a position inside the flue, corresponding to a definite position of the denitration apparatus 3 in the boiler facilities as shown in FIG. 1, so as to be contacted with the exhaust gas. The test conditions in this case are shown in Tables 1 and 2.

TABLE 1

| Item | Example 1 | Example 2 | Example 3 | Comp. ex. |
|---|---|---|---|---|
| Temperature (°C.) | 360 | 370 | 360 | 380 |
| Gas composition in average | | | | |
| $O_2$ (%) | 4 | 3 | 7.5 | 1.5 |
| SOx (ppm) | 3000 | 1000 | 1000 | 600 |
| NOx (ppm) | 1800 | 2400 | 1600 | 1200 |
| Dust Concentration (g/Nm³) | 15 | 7 | 10 | 30 |

TABLE 2

| Item | Condition |
|---|---|
| Measured temperature (°C.) | 350 |

TABLE 2-continued

| Item | Condition |
|---|---|
| Area measurement AV (m/h) | 51 |
| Gas composition | |
| $O_2$ (%) | 3 |
| $CO_2$ (%) | 12 |
| $H_2O$ (%) | 12 |
| $SO_2$ (ppm) | 500 |
| NO (ppm) | 200 |
| $NH_3$ (ppm) | 240 |

The catalyst 4 was sampled each definite time and change in the catalyst activity with lapse of time was measured. The results are shown in FIG. 3.

Figure 4:
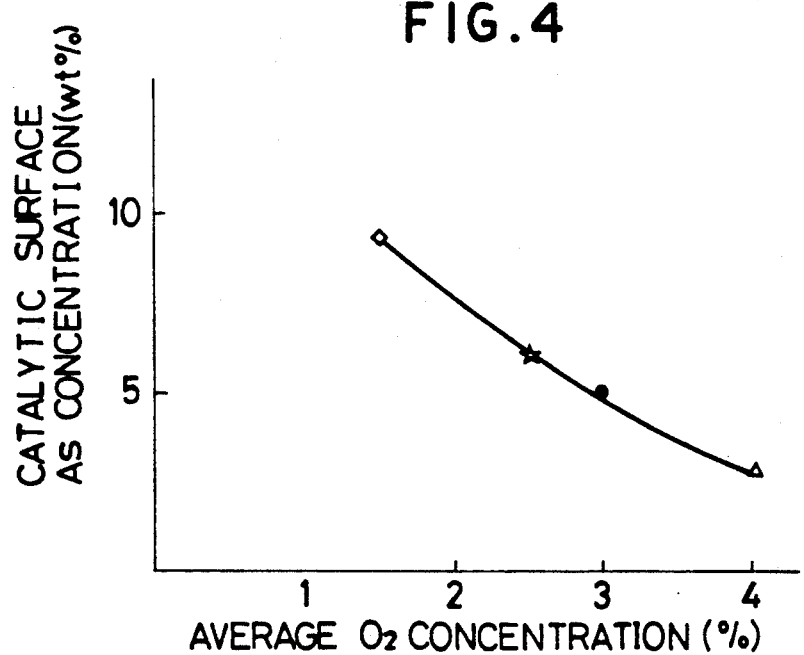

Further, the concentration of arsenic adsorbed onto the catalyst surface after about 1,000 hours was measured. FIG. 4 shows a chart obtained by plotting the As concentration relative to $O_2$ concentration in the exhaust gas.

Figure 3:
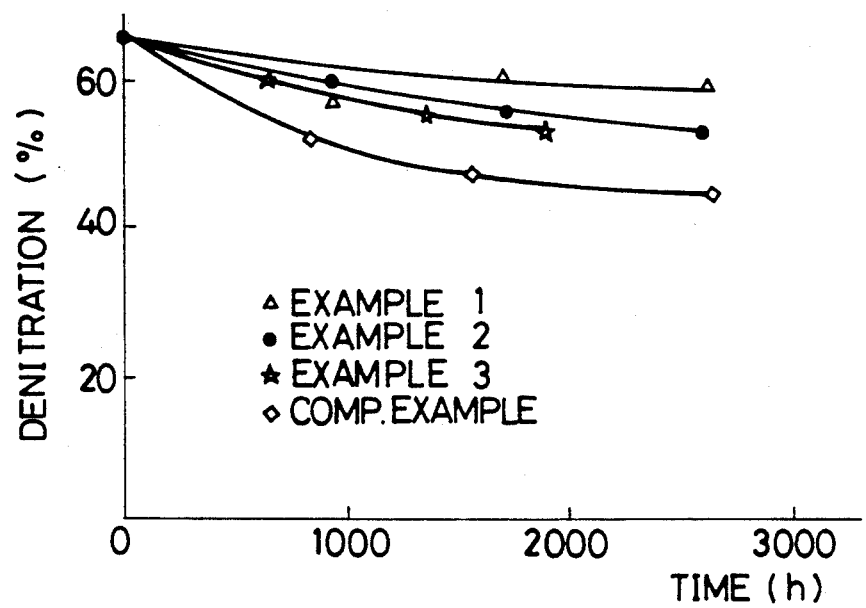
FIG. 3 and 4 each show a chart illustrating the effectiveness of Examples of the present invention.

As seen from FIG. 3, when $O_2$ concentration is low, notable reduction in the activity in a short time is observed, but when $O_2$ concentration exceeds 2%, activity reduction becomes successively less.

Further, as seen from FIG. 4, as $O_2$ concentration is raised, the quantity of arsenic accumulated on the catalyst surface is notably reduced.

According to the present invention, it is possible to notably reduce deterioration of the denitration catalyst in boiler apparatus and also it is possible to notably reduce the amount of the catalyst used.

What we claim is:

1. A method for eliminating volatile metal compounds present in an exhaust gas of a coal combustion apparatus provided with a denitration means for catalytic reduction with ammonia, comprising the steps of:
   blowing an air into the exhaust gas prior to feeding the exhaust gas to the denitration means, the air having a temperature of at least 500° C., and blown into the exhaust gas until said exhaust gas contains at least about 2% by volume of oxygen to oxidize said volatile metal compounds; and
   causing said oxidized metal compounds to adsorb onto fly ash present in the exhaust gas during the process of the exhaust gas moving downstream to the denitration means.

2. A method for eliminating volatile metal compounds according to claim 1, wherein fly ash is collected at an exit flow path of the denitration means and recycled to the combustion apparatus to adsorb volatile metal compounds present in the exhaust gas.

3. A method for eliminating volatile metal compounds according to claim 1, wherein said air is blown into the exhaust gas until said exhaust gas contains about 3 to 4% by volume of oxygen to oxidize said volatile metal compounds.

4. A method for eliminating volatile metal compounds from an exhaust gas produced by a coal combustion apparatus having a denitration means for catalytic reduction of nitrogen oxides with ammonia, comprising the steps of:
   blowing heated air into a coal combustion exhaust gas to provide an exhaust gas containing at least about 2% by volume oxygen;
   oxidizing volatile metal compounds present in the exhaust gas to provide resulting oxidized metal compounds;
   absorbing the resulting oxidized metal compounds onto fly ash present in the exhaust gas;
   recycling the fly ash to the coal combustion apparatus.

5. A method for eliminating volatile metal compounds from an exhaust gas according to claim 4, wherein the air is heated to a temperature of at least about 500° C. prior to the step of blowing heated air into a coal combustion exhaust gas.

6. A method for eliminating volatile metal compounds from an exhaust gas according to claim 4, wherein the air is blown into a coal combustion exhaust gas to provide an exhaust gas containing about 3-4% by volume oxygen.

* * * * *